United States Patent
MP

(10) Patent No.: US 12,174,887 B2
(45) Date of Patent: Dec. 24, 2024

(54) MAPPING EXPRESSION GENERATOR

(71) Applicant: SAP SE, Walldorf (DE)

(72) Inventor: Deepak MP, Bangalore (IN)

(73) Assignee: SAP SE, Walldorf (DE)

( * ) Notice: Subject to any disclaimer, the term of this patent is extended or adjusted under 35 U.S.C. 154(b) by 293 days.

(21) Appl. No.: 17/094,346

(22) Filed: Nov. 10, 2020

(65) Prior Publication Data
US 2022/0147568 A1    May 12, 2022

(51) Int. Cl.
| | |
|---|---|
| G06F 16/84 | (2019.01) |
| G06F 11/34 | (2006.01) |
| G06F 16/832 | (2019.01) |
| G06F 16/835 | (2019.01) |
| G06F 16/838 | (2019.01) |
| H04L 67/01 | (2022.01) |
| H04L 67/306 | (2022.01) |

(52) U.S. Cl.
CPC .......... *G06F 16/84* (2019.01); *G06F 11/3409* (2013.01); *G06F 16/832* (2019.01); *G06F 16/8373* (2019.01); *G06F 16/838* (2019.01); *H04L 67/01* (2022.05); *H04L 67/306* (2013.01)

(58) Field of Classification Search
CPC .... G06F 16/84; G06F 16/838; G06F 16/8373; G06F 16/832
USPC .......................................................... 707/802
See application file for complete search history.

(56) References Cited

U.S. PATENT DOCUMENTS

| | | | | | |
|---|---|---|---|---|---|
| 5,560,005 | A * | 9/1996 | Hoover | ................. | G06F 16/245 |
| 7,720,873 | B2 * | 5/2010 | Loving | ................. | G06F 16/213 |
| | | | | | 707/804 |
| 7,853,553 | B2 * | 12/2010 | Lankinen | .............. | G06F 16/258 |
| | | | | | 707/602 |
| 7,865,531 | B2 * | 1/2011 | Gaurav | ............. | G06F 16/90324 |
| | | | | | 707/802 |
| 8,086,560 | B2 * | 12/2011 | Hernandez-Sherrington | .............. | |
| | | | | | G06F 16/258 |
| | | | | | 707/774 |
| 8,122,055 | B2 * | 2/2012 | Grewal | ................. | G06Q 10/10 |
| | | | | | 707/610 |
| 9,201,558 | B1 * | 12/2015 | Dingman | ................. | G06F 15/16 |
| 9,336,327 | B2 * | 5/2016 | Melnik | ................. | G06F 16/258 |
| 9,430,114 | B1 * | 8/2016 | Dingman | ................. | G06F 16/25 |
| 10,027,596 | B1 * | 7/2018 | Harwood | ................. | G06F 16/86 |

(Continued)

*Primary Examiner* — Tony Mahmoudi
*Assistant Examiner* — Michael Le
(74) *Attorney, Agent, or Firm* — Buckley, Maschoff & Talwalkar LLC

(57) ABSTRACT

Methods and systems may be associated with a cloud platform computing environment. A mapping expression data store may contain mapping expressions previously created by customer tenants of the cloud platform. Each mapping expression may be associated with at least one source mapping element and at least one target mapping element. A mapping expression generator may receive, from a user of a first customer tenant, a mapping expression search request that includes at least one requested source mapping element and at least one requested target mapping element. The mapping expression generator may then search the mapping expression data store based on the at least one requested source mapping element and at the least one requested target mapping element and output a result of the search to the user. The result of the search may include at least one mapping expression created by a customer tenant other than the first customer tenant.

20 Claims, 12 Drawing Sheets

(56) References Cited

U.S. PATENT DOCUMENTS

| | | | |
|---|---|---|---|
| 10,402,380 B1* | 9/2019 | Carr | G06F 16/84 |
| 10,452,646 B2* | 10/2019 | Schlarb | G06F 16/248 |
| 10,467,237 B1* | 11/2019 | Silbermann | G06F 16/248 |
| 2002/0091702 A1* | 7/2002 | Mullins | G06F 16/25 |
| 2003/0014617 A1* | 1/2003 | Tamboli | G06F 16/258 713/1 |
| 2003/0120665 A1* | 6/2003 | Fox | G06F 16/25 |
| 2003/0149934 A1* | 8/2003 | Worden | G06F 16/252 715/239 |
| 2003/0167274 A1* | 9/2003 | Dettinger | G06F 16/2423 |
| 2003/0177481 A1* | 9/2003 | Amaru | G06F 16/25 717/148 |
| 2004/0015783 A1* | 1/2004 | Lennon | G06F 16/248 715/255 |
| 2004/0078386 A1* | 4/2004 | Moon | G06F 16/30 707/999.102 |
| 2004/0158567 A1* | 8/2004 | Dettinger | G06F 16/211 |
| 2005/0005261 A1* | 1/2005 | Severin | G06F 8/316 717/116 |
| 2005/0028084 A1* | 2/2005 | Dziejma | G06F 40/226 715/225 |
| 2005/0160110 A1* | 7/2005 | Charlet | G06F 16/284 707/999.102 |
| 2005/0257193 A1* | 11/2005 | Falk | G06F 8/315 717/109 |
| 2006/0101073 A1* | 5/2006 | Popa | G06F 16/84 |
| 2006/0161869 A1* | 7/2006 | Robertson | G06F 16/84 707/E17.124 |
| 2006/0167909 A1* | 7/2006 | Mendis | G06F 16/258 |
| 2006/0230033 A1* | 10/2006 | Halevy | G06F 40/174 |
| 2006/0271506 A1* | 11/2006 | Bohannon | G06F 16/88 |
| 2007/0150495 A1* | 6/2007 | Koizumi | G06F 16/36 |
| 2007/0156650 A1* | 7/2007 | Becker | G06F 16/958 |
| 2007/0156737 A1* | 7/2007 | Barnes | G06F 16/258 |
| 2007/0179939 A1* | 8/2007 | O'Neil | G06F 16/252 |
| 2007/0198539 A1* | 8/2007 | Warshavsky | G06F 16/86 |
| 2007/0220022 A1* | 9/2007 | Lankinen | G06F 16/258 |
| 2007/0226196 A1* | 9/2007 | Adya | G06F 16/24539 |
| 2008/0091700 A1* | 4/2008 | Brotherson | G06F 40/186 707/999.102 |
| 2008/0320012 A1* | 12/2008 | Loving | G06F 16/213 |
| 2009/0049056 A1* | 2/2009 | Shutt | G06F 16/27 |
| 2009/0077014 A1* | 3/2009 | Zachariah | G06F 16/214 707/999.005 |
| 2009/0077114 A1* | 3/2009 | Zachariah | G06F 16/258 707/999.102 |
| 2009/0150367 A1* | 6/2009 | Melnik | G06F 16/86 |
| 2009/0249187 A1* | 10/2009 | Morris | G06F 8/51 715/234 |
| 2010/0070500 A1* | 3/2010 | Cui | G06F 16/84 707/736 |
| 2010/0082387 A1* | 4/2010 | Cao | G06Q 10/06 705/7.38 |
| 2010/0161627 A1* | 6/2010 | Vossen | G06F 16/20 707/755 |
| 2010/0235322 A1* | 9/2010 | Kuruganti | G06Q 10/06 707/610 |
| 2010/0262836 A1* | 10/2010 | Peukert | G06F 21/6254 707/E17.014 |
| 2011/0213816 A1* | 9/2011 | Doshi | G06F 16/182 707/827 |
| 2011/0302133 A1* | 12/2011 | Kuruganti | G06F 16/25 707/E17.005 |
| 2012/0084330 A1* | 4/2012 | Huynh | G06F 40/143 707/E17.127 |
| 2012/0143819 A1* | 6/2012 | Tan | G06F 16/27 707/626 |
| 2012/0330960 A1* | 12/2012 | Koosel | G06F 16/211 707/E17.089 |
| 2013/0297661 A1* | 11/2013 | Jagota | G06F 16/11 707/822 |
| 2013/0325789 A1* | 12/2013 | Krishnan | G06F 16/254 707/602 |
| 2014/0032617 A1* | 1/2014 | Stanfill | G06F 16/25 707/809 |
| 2014/0075280 A1* | 3/2014 | Laakmann | G06F 40/174 715/225 |
| 2014/0095519 A1* | 4/2014 | Liu | G06F 16/81 707/769 |
| 2014/0324857 A1* | 10/2014 | Hazelwood | G06F 16/907 707/736 |
| 2015/0100542 A1* | 4/2015 | Li | G06F 16/254 707/602 |
| 2015/0261824 A1* | 9/2015 | Jha | G06F 16/24564 707/690 |
| 2017/0004201 A1* | 1/2017 | Snell | G06F 16/24534 705/3 |
| 2017/0060919 A1* | 3/2017 | Ramachandran | G06F 16/258 |
| 2017/0075984 A1* | 3/2017 | Deshpande | G06F 16/9535 |
| 2017/0124069 A1* | 5/2017 | Bondarchuk | G06F 40/106 |
| 2017/0235887 A1* | 8/2017 | Cox | G16H 10/60 705/3 |
| 2018/0129374 A1* | 5/2018 | Kim | G06F 3/04845 |
| 2018/0196859 A1* | 7/2018 | Srivastava | G06F 16/2365 |
| 2018/0225317 A1* | 8/2018 | Lalani | G06F 16/9017 |
| 2018/0278725 A1* | 9/2018 | Thayer | G06F 16/86 |
| 2019/0163679 A1* | 5/2019 | Srinivasa | G06F 16/2465 |
| 2019/0171651 A1* | 6/2019 | Suresh | G06F 16/283 |
| 2019/0188035 A1* | 6/2019 | Nicholson | H04L 67/12 |
| 2019/0197137 A1* | 6/2019 | Braud | G06F 16/248 |
| 2019/0384750 A1* | 12/2019 | Olivier | G06F 16/22 |
| 2019/0384836 A1* | 12/2019 | Roth | G06F 16/252 |
| 2019/0385129 A1* | 12/2019 | Jamkhedkar | G06F 16/2379 |
| 2019/0386831 A1* | 12/2019 | Jamkhedkar | H04L 9/3247 |
| 2020/0026532 A1* | 1/2020 | Bill | G06F 3/04842 |
| 2020/0301902 A1* | 9/2020 | Maloy | G06F 16/2246 |
| 2020/0334270 A1* | 10/2020 | Vasireddy | G06F 16/214 |
| 2021/0117437 A1* | 4/2021 | Gibson | G06F 16/258 |
| 2021/0149854 A1* | 5/2021 | Barde | H04L 63/126 |

* cited by examiner

MAPPING EXPRESSION GENERATOR

BACKGROUND

An enterprise may utilize a cloud platform integration environment to let users perform tasks. For example, the enterprise might let various users execute an application via a cloud computing environment to process purchase orders, adjust human resources information, generate invoices, etc. In some cases, the cloud computing environment will support multiple tenants or customers. A cloud platform integration environment may offer tools to help integrate systems (e.g., an accounting system, a human resources system, etc.) and let those systems exchange information with each other. These tools may include information flows and/or adapters deployed on virtual machines. To help facilitate an accurate exchange of information, message mapping expressions may be defined to create appropriate target data elements from one or more source data elements. These message mapping expressions, however, can be difficult and time consuming for a customer to create—especially when a substantial number of data elements are involved.

It would therefore be desirable to facilitate creation of mapping expressions for a cloud computing environment in a secure, automatic, and efficient manner.

SUMMARY

According to some embodiments, methods and systems may be associated with a cloud platform computing environment. A mapping expression data store may contain mapping expressions previously created by customer tenants of the cloud platform. Each mapping expression may be associated with at least one source mapping element and at least one target mapping element. A mapping expression generator may receive, from a user of a first customer tenant, a mapping expression search request that includes at least one requested source mapping element and at least one requested target mapping element. The mapping expression generator may then search the mapping expression data store based on the at least one requested source mapping element and at the least one requested target mapping element and output a result of the search to the user. The result of the search may include at least one mapping expression created by a customer tenant other than the first customer tenant.

Some embodiments comprise: means for receiving, from a user of a first customer tenant, a mapping expression search request that includes at least one requested source mapping element and at least one requested target mapping element; means for searching a mapping expression data store based on the at least one requested source mapping element and at the least one requested target mapping element, the mapping expression data store containing mapping expressions previously created by a plurality customer tenants of a cloud platform, each mapping expression being associated with at least one source mapping element and at least one target mapping element; and means for outputting a result of the search to the user, the result of the search including at least one mapping expression created by a customer tenant other than the first customer tenant.

Some technical advantages of some embodiments disclosed herein are improved systems and methods to facilitate creation of mapping expressions associated with a cloud computing environment in a secure, automatic, and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A cloud platform integration environment, such as the SAP® Cloud Platform Integration ("CPI") environment may provide customer tools to integrate systems and help the systems communicate with each other. To integrate a system, a customer may create an information flow and use adapters to help the systems communication with each other. These flows may then be deployed on Virtual Machines ("VMs"). After a flow is deployed, different systems in a customer's organization may communicate with each other and help the customer run the business smoothly.

Figure 1:
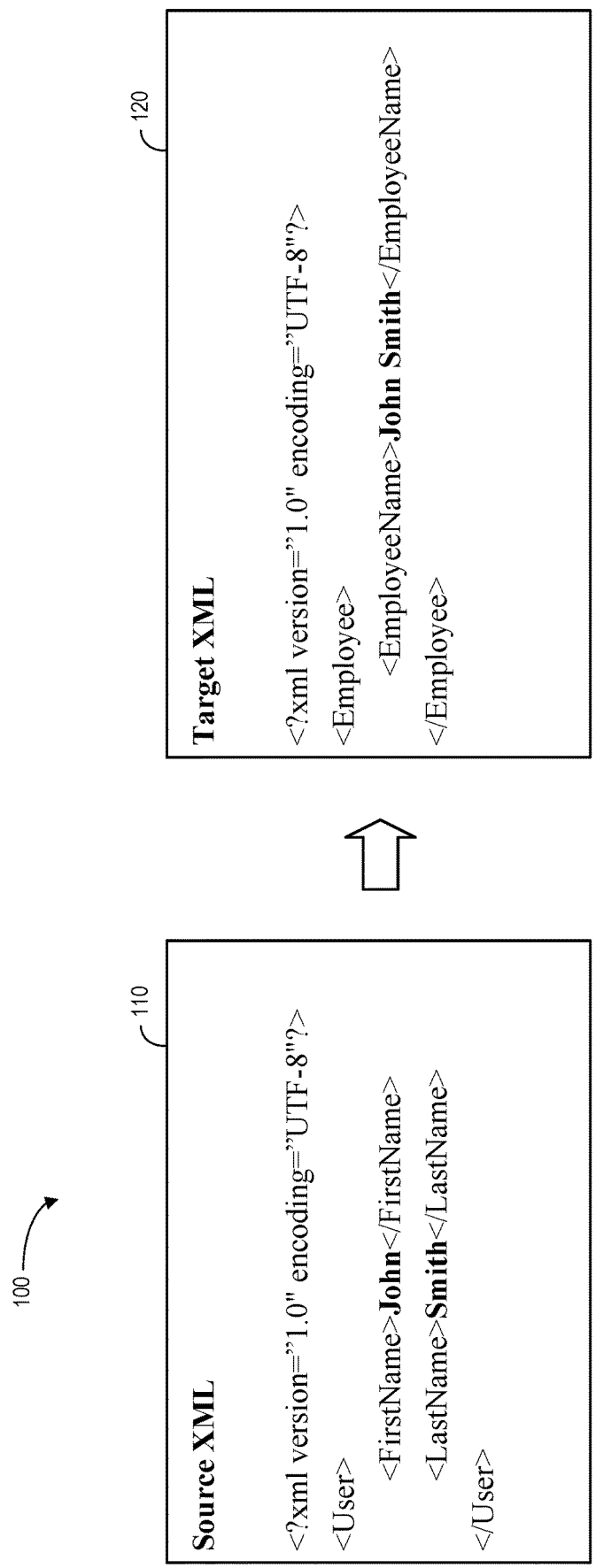
FIG. 1 illustrates a simple example of message mapping according to some embodiments.

A cloud platform integration environment may offer several components that are each responsible for performing a different operation. For example, one such component is message mapping. Message mapping is responsible for transforming an incoming source Extensible Markup Language ("XML") to a target XML of a different form. For example, FIG. 1 illustrates a simple example 100 of message mapping from a source XML 110 to a target XML 120 according to some embodiments. In this example 100, the source XML 110 has two elements: "FirstName" and "Last- Name." Using a message mapping component, one can transform this source XML 110 to the target XML 120 having single element named "EmployeeName" (the concatenated value of the source XML 110 elements). To produce the expected target XML 120 (FirstName and LastName), the system must concatenate the source XML 110 data elements.

Figure 2:
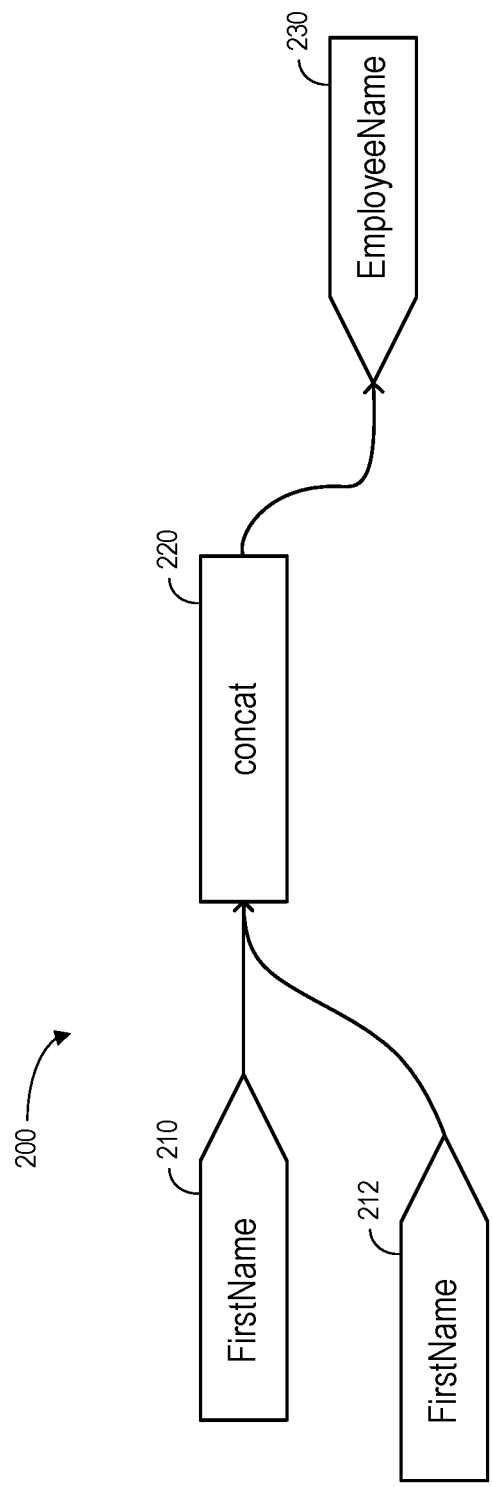
FIG. 2 is a simple example of a mapping expression editor display in accordance with some embodiments.

Message mapping may offer a set of standard functions and/or custom functions to help achieve this type of result (and "Concat" is one such function). For example, FIG. 2 is a simple example of a mapping expression editor display 200 in accordance with some embodiments (associated with an expression editor). As before, there are two source elements 210, 212 from a source XML that are mapped to a target element EmployeeName 230 using the standard function Concat 220. This is a simple use case of message mapping and may be relatively easy for a user to build.

Figure 3:
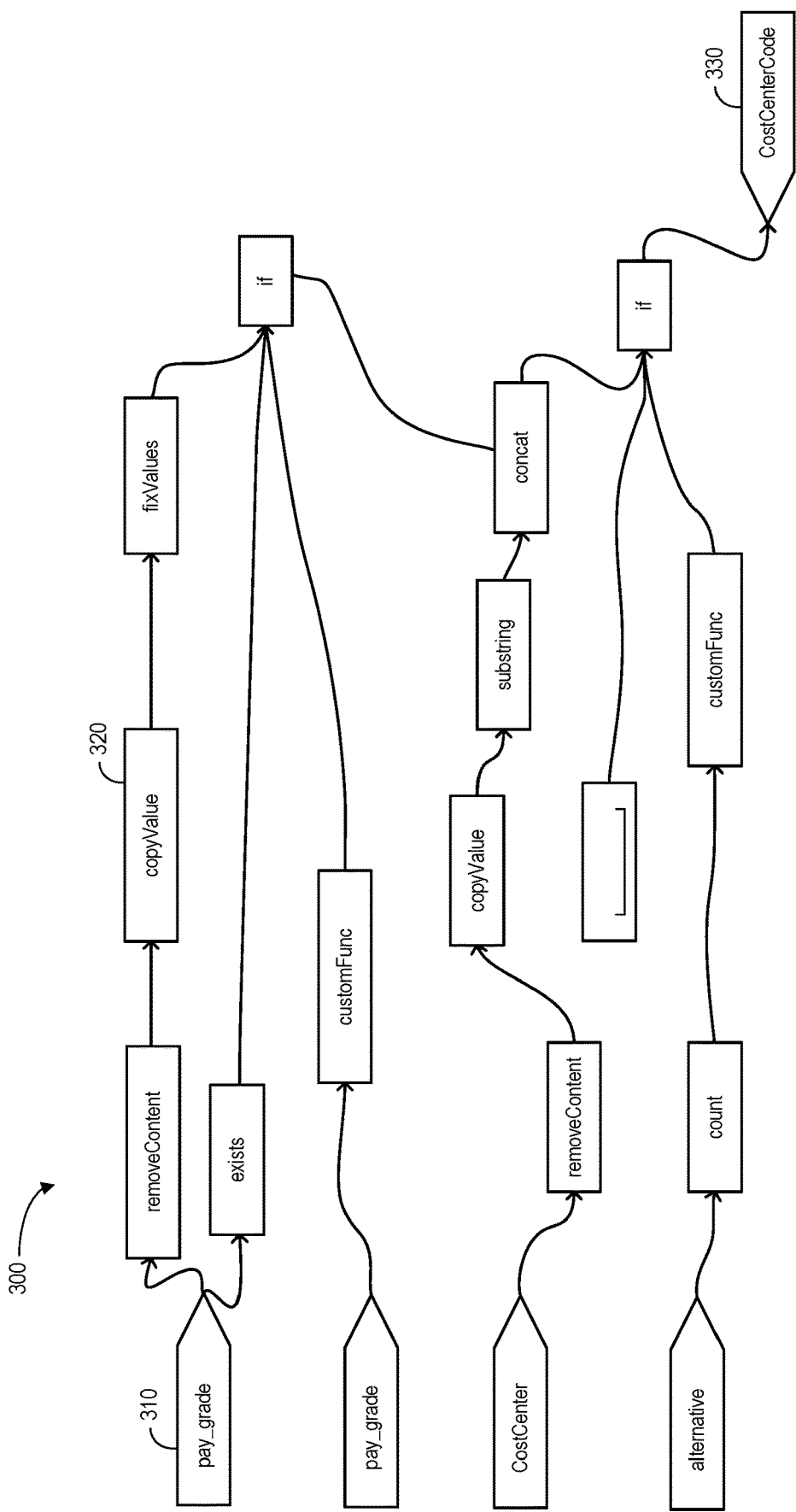
FIG. 3 is a more complex example of a mapping expression editor display in accordance with some embodiments.

FIG. 3 is a more complex example of a mapping expression editor display 300 in accordance with some embodiments. In this example, there are three source elements 310 ("pay grade," "costCenter," and "alternative") that are mapped to one target element 330 "CostCenterCode" via a set of functions 320. To build such a mapping expression may take a substantial amount of time. If user had to create tens, or even hundreds, of such mapping expressions a significant amount of time and/or cost may be involved. Note that in addition to creating a mapping expression, a user may also need test the expression to ensure that it provides output as expected.

Figure 4:
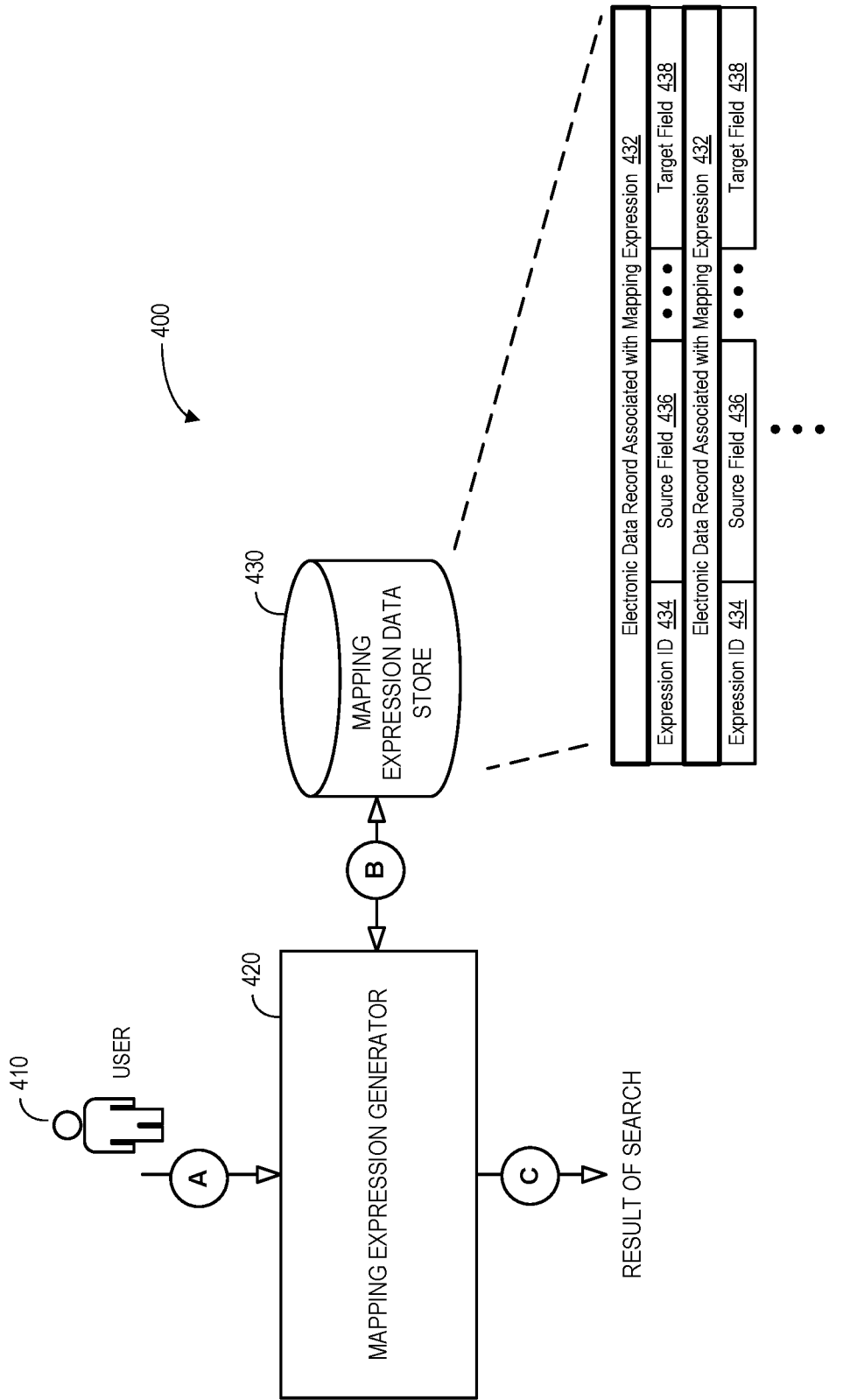
FIG. 4 is a high-level block diagram of a system in accordance with some embodiments.

To reduce the overhead associated with building such complex mapping expressions, some embodiments described herein provide a mapping expression generator. The mapping expression generator may help automatically provide an appropriate mapping expression for a user based on source xpath and target xpath elements that match values given by the user. For example, FIG. 4 is a high-level block diagram of a system 400 in accordance with some embodiments. The system 400 includes a mapping expression generator 420 that accesses information in a mapping expression data store 430. The mapping expression generator 420 might use this information, for example, to help a user 410 creating an appropriate mapping expression. The process might be performed automatically or be initiated via a command from a remote operator interface device. As used herein, the term "automatically" may refer to, for example, actions that can be performed with little or no human intervention.

As used herein, devices, including those associated with the system 400 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The mapping expression generator 420 may store information into and/or retrieve information from various data stores (e.g., the mapping expression data store 430), which may be locally stored or reside remote from the mapping expression generator 420. Although a single mapping expression generator 420 and mapping expression data store 430 are shown in FIG. 4, any number of such devices may be included. Moreover, various devices described herein might be combined according to embodiments of the present invention. For example, in some embodiments, the mapping expression data store 430 and the mapping expression generator 420 might comprise a single apparatus. The system 400 functions may be performed by a constellation of networked apparatuses, such as in a distributed processing or cloud-based architecture.

A user or administrator may access the system 400 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define how systems interact) and/or provide or receive automatically generated recommendations or results from the system 400. The mapping expression data store 430 may contain electronic data records 432 associated with a mapping expression created by various customers (e.g., with each record containing an expression identifier 434, a source field 436, a target field 438, etc.).

At (A), the user 410 may provide a set of desired source fields and desired target fields to the mapping expression generator 420. The mapping expression generator 420 may then search the mapping expression data store 430 at (B) looking for records 432 that have matching source fields 436 and target fields 438. The results of this search may then be output at (C) to help automate the mapping expression creation process for the user 410.

Figure 5:
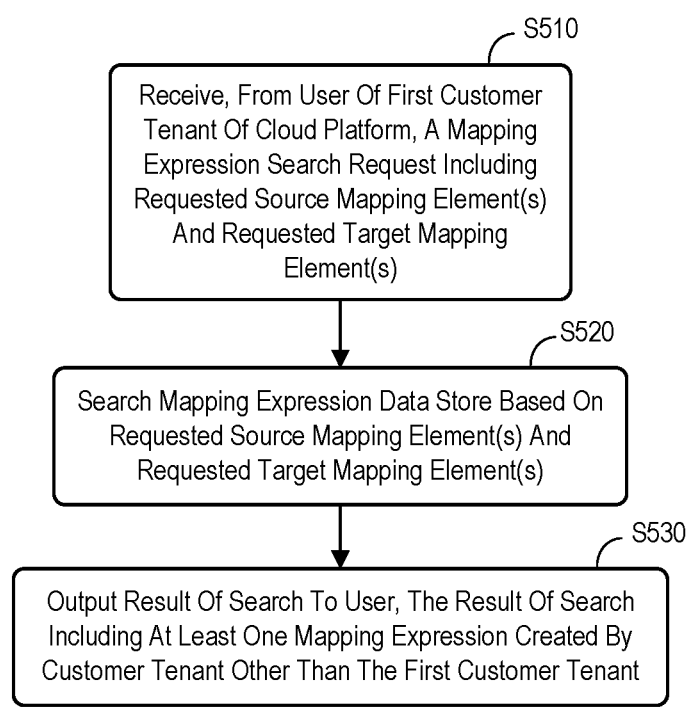
FIG. 5 is a method according to some embodiments.

FIG. 5 is a method that might performed by some or all of the elements of the system 400 described with respect to FIG. 4. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S510, the system may receive, from a user of a first customer tenant, a mapping expression search request that includes at least one requested source mapping element and at least one requested target mapping element. According to some embodiments, the source mapping elements are source XML elements and the target mapping elements are target XML elements. At S520, the system may search a mapping expression data store based on the at least one requested source mapping element and at the least one requested target mapping element. The mapping expression data store may contain, for example, mapping expressions previously created by a plurality customer tenants of a cloud platform (each mapping expression being associated with at least one source mapping element and at least one target mapping element).

At S530, the system may output a result of the search to the user. The result of the search may include, for example, at least one mapping expression created by a customer tenant other than the first customer tenant. According to some embodiments, the result of the search includes multiple potential mapping expressions. Moreover, the mapping expression generator might further receive, from the user, a sample file including sample source mapping elements and sample target mapping elements. In this case, the mapping expression generator may test the result of the search using the sample file before outputting the result of the search to the user. For example, at least some of the multiple potential mapping expressions might be removed from the result of the search based on tests using the sample file. In other embodiments, at least some of the multiple potential mapping expressions are removed from the result of the search based on a performance parameter (e.g., speed, resources, memory, disk space, processing power, etc.).

Figure 6:
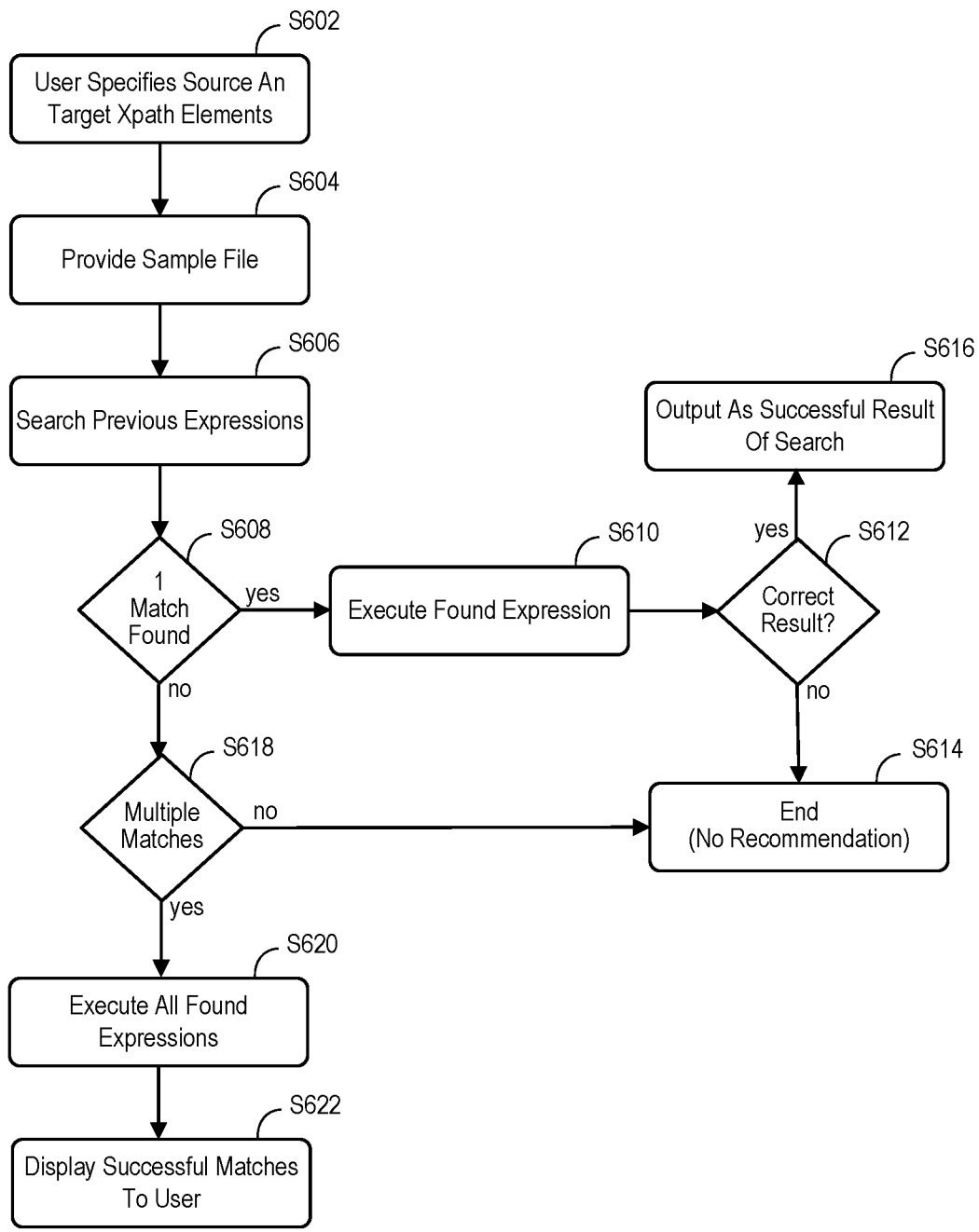
FIG. 6 is a mapping expression search method in accordance with some embodiments.

In this way, a mapping expression generator may crowd-source mapping expressions created by multiple cloud platform customers. FIG. 6 is a mapping expression search method in accordance with some embodiments. At S602, a user may specify source and target xpath elements that need to be mapped. At S604, the user may also provide sample input file and a desired output file for testing purposes.

At S606, a mapping expression generator searches crowd-sourced mapping expressions that match the source and target xpath. If a single match is found at S608, it is executed at S610 using the sample XML provided by user. If the result of the execution does not match the desired output specified by the user at S612, the process ends at S614 and there is no recommendation to the user. If the result of the execution does match the target value specified by the user at S612, the system marks this expression as a match and generates the mapping expression automatically on the User Interface ("UI") at S616. That is, if the single expression was able to produce the expected result, then this expression is rendered directly in the UI mapping expression editor.

If multiple expressions do not match the user provided source and target xpath at S618, the process ends at S614 and there is no recommendation to the user (that is no previously defined messaging mapping expression matches were found). If multiple expressions match the user provided source and target xpath at S618, all the matching expressions are merged into a single file and that is executed at S620 using the sample payload provided by the user. After execution, expressions that were able to produce the results as expected by the user are selected and displayed to the user at S622. If there are multiple expressions that were able to produce the target values provided by user, then all of these expressions may be sent to the UI (and the user can select one of the expressions to be automatically added to the mapping editor).

Figure 7:
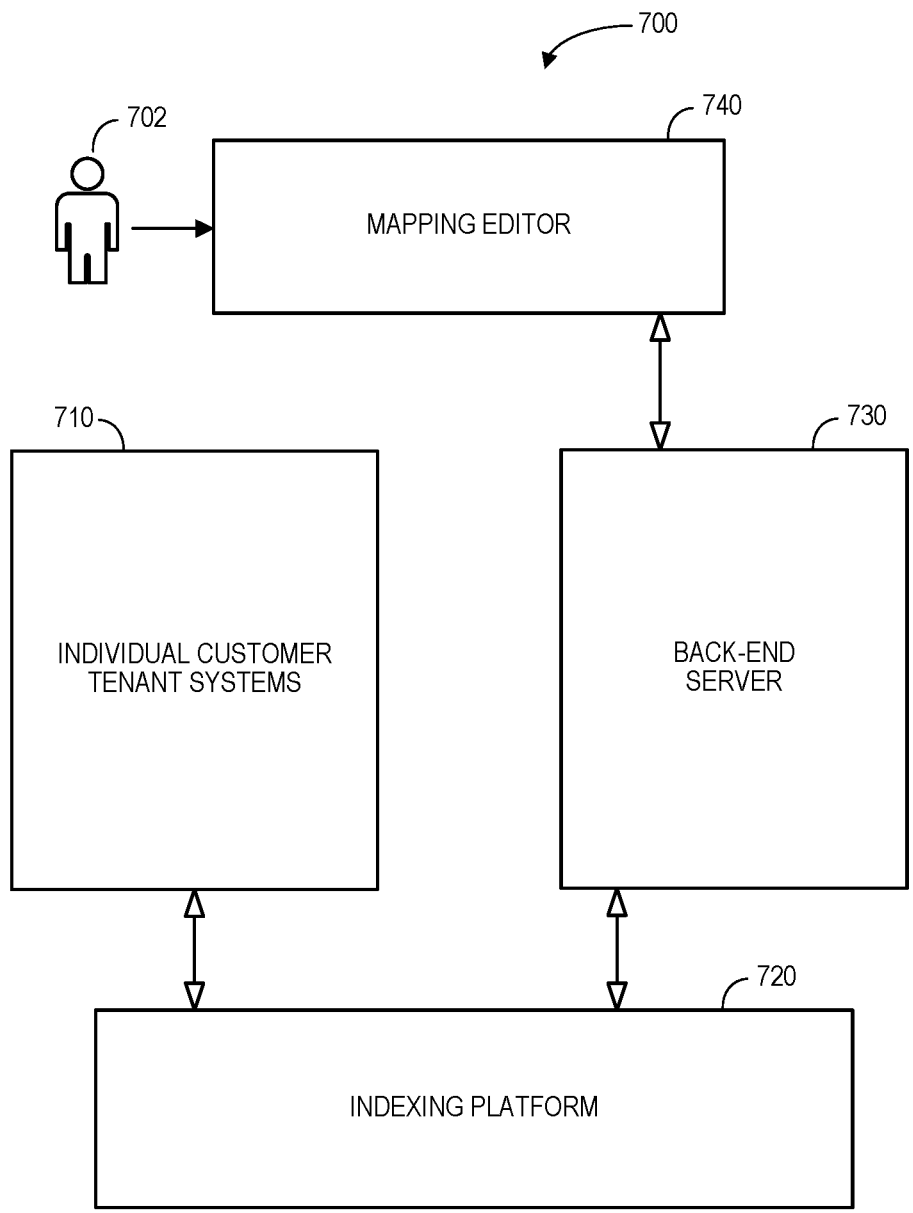
FIG. 7 is a mapping expression system according to some embodiments.

FIG. 7 is a mapping expression system 700 according to some embodiments. Individual customer tenant systems 710 may be assigned for each customer, where the customer can create designs, execute prototypes, and store message mappings. An indexing platform 720 may index the mapping expressions crowd sourced from customer tenants for later use during mapping expression searches. A back-end server 730 may be where most of the backend processing takes place (testing, etc.). A user 702 may access a mapping editor 740 (which also consists of a mapping expression editor) to perform searches and/or create message mapping expressions.

Figure 8:
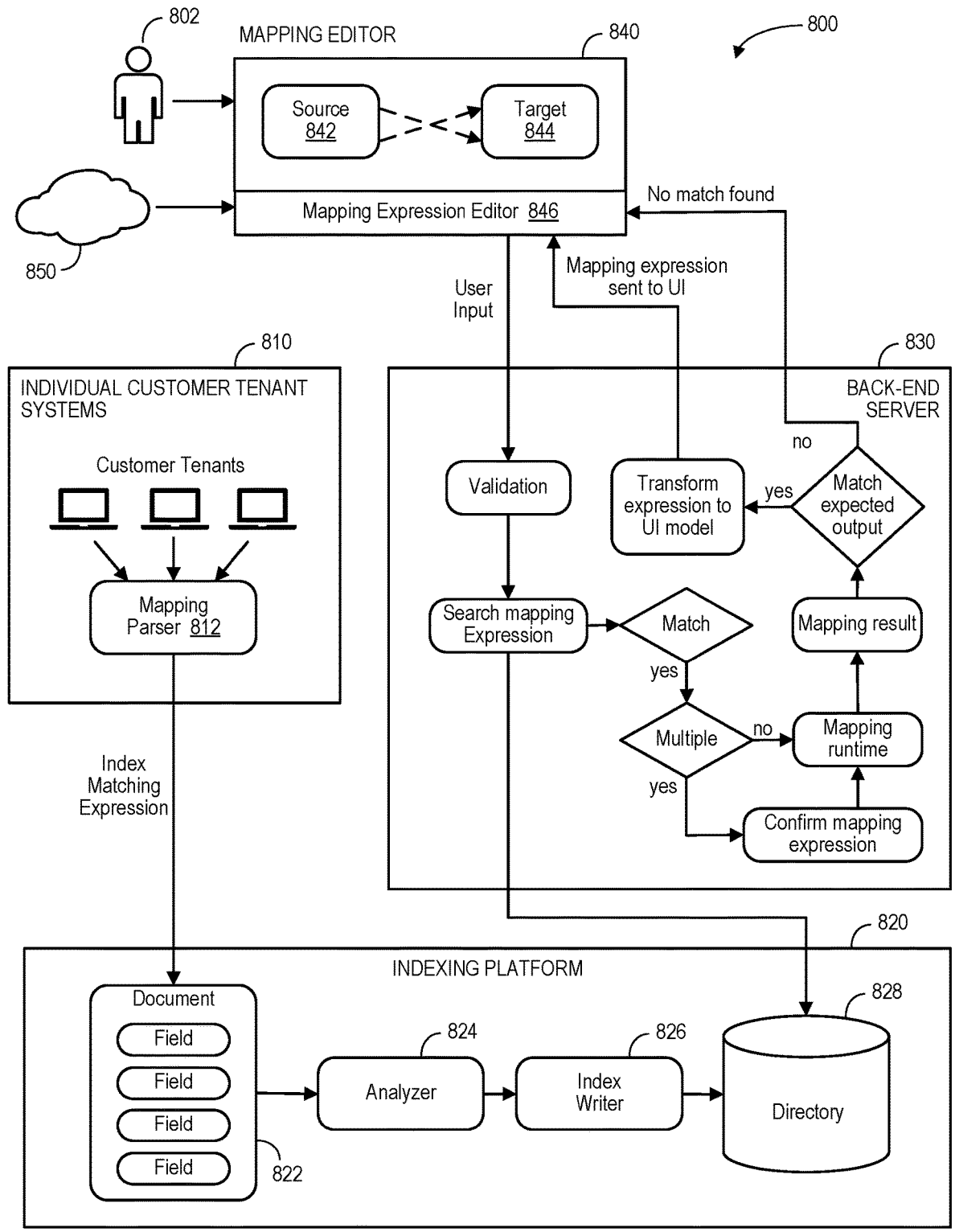
FIG. 8 is a more detailed mapping expression system in accordance with some embodiments.

FIG. 8 is a more detailed mapping expression system 800 in accordance with some embodiments. As before, individual customer tenant systems 810 including a mapping parser 812 may be assigned for each customer, where the customer can create designs, execute prototypes, and store message mappings. An indexing platform 820 may index fields in a document 822 via an analyzer 824 and store results in a directory 828 via an index writer 826 for later use during mapping expression searches. A back-end server 830 may be where most of the backend processing takes place (testing, etc.). A user 802 may access a mapping editor 840 with a mapping expression editor 846 to create sources 842 and targets 844.

As a first step, the system 800 may crowd source all mapping expressions created by all if the customer tenants. These mappings may be parsed by the mapping parser 812, and individual expressions may be extracted by the indexing platform 820. For each of these expressions, the system may determine the source and target xpath and all of this information may be indexed in the director 828.

When a new or existing customer or user 802 is trying to map a source and target using mapping expression editor 846, he or she can use a feature where the user selects a source 842 and target 844 xpath to be mapped. According to some embodiments, the user may also specify a sample input and an expected target output. The user 802 may select a "suggest" icon and the request will be sent to the back-end server 830.

In the server 830, several operations may be performed. For example, the request from the UI may be validated for mandatory information required to search the mapping expressions in the indexing platform 820 directory 828. The search may be performed on the directory 828, for example, using the source and target xpath as a key. If the directory 828 doesn't return any search result, the user 802 will be notified.

If the directory 828 returns any search result, the back-end server 830 may perform a check to determine if single or multiple expressions were returned. If a single expression was returned, it may then be forwarded to the next step for further execution. If Multiple expressions were returned, then of all these expressions may be merged into a single file which is then forwarded to the next step for further execution.

A mapping runtime may be responsible for executing the mapping expression returned from indexing platform 820 using the input provided by the user. After the execution of each of the expressions, the corresponding result is compared against the target value expected by the user 802. If there are matches, then those mapping expressions are transformed into a UI model and sent to the mapping expression editor 846 in the UI for rendering. If there is a single expression that was able to produce the target value provided by the user 802, then this mapping expression is automatically rendered in UI. If there are multiple matches, then all of these mapping expressions are rendered in UI and the user 820 can select expressions as desired (e.g., based on how well each expression performed in terms of execution time, required resources, etc.).

Figure 9:
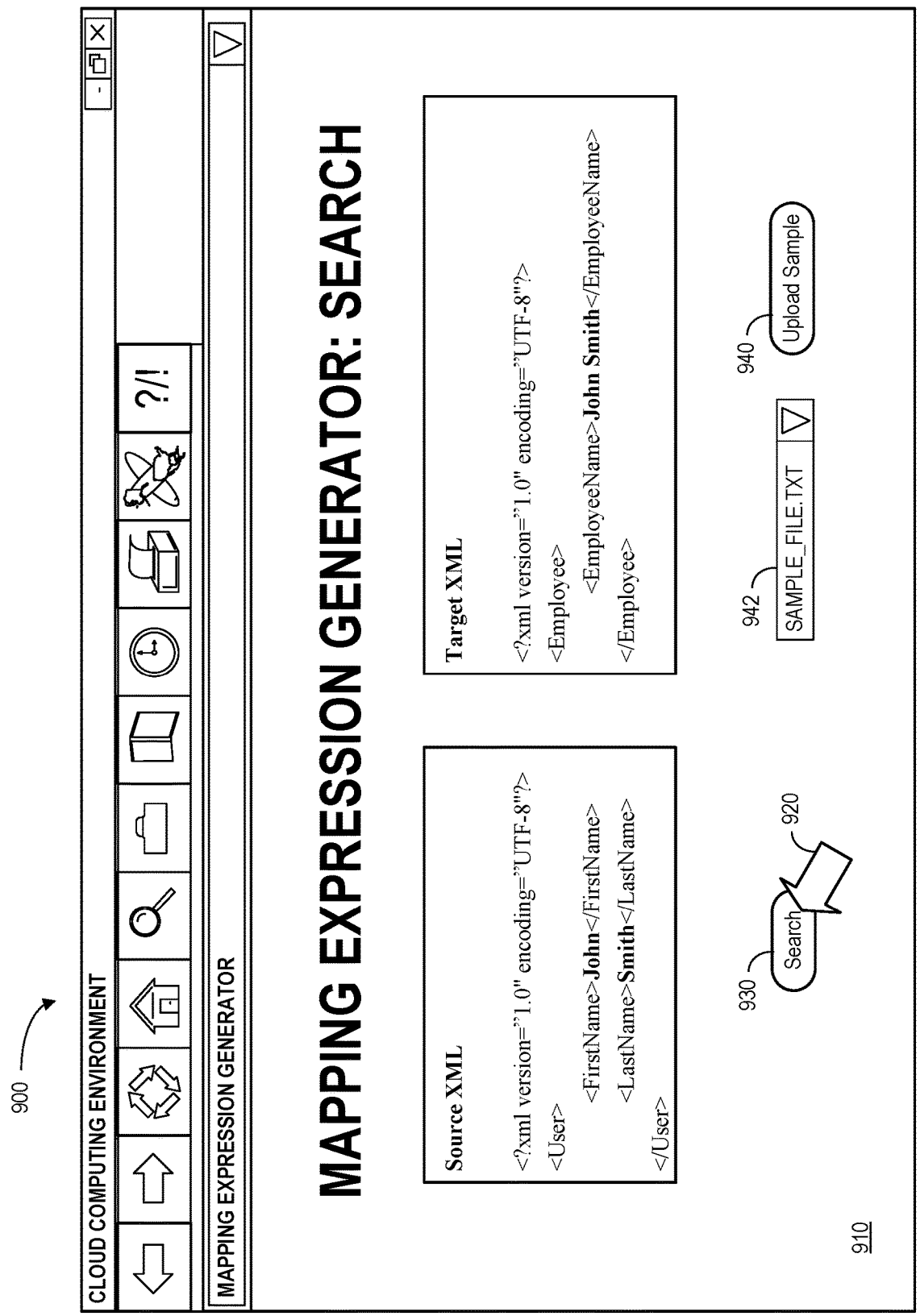
FIG. 9 is a mapping expression search display according to some embodiments.

FIG. 9 is a mapping expression search display 900 according to some embodiments. The display 900 includes a graphical representation 910 of a message mapping system in accordance with any of the embodiments described herein. Selection of an element on the display 900 (e.g., via a touchscreen or a computer pointer 920) may result in display of a popup window containing more detailed information about that element and/or various options (e.g., to add a data element, modify a mapping, etc.). Selection of a "Search" icon 930 may let an operator or administrator look for previously defined mapping expressions. Selection of an "Upload Sample" 940 may let the user provide a test file to filter potential results (e.g., a file specified in a dropdown menu 942).

Figure 10:
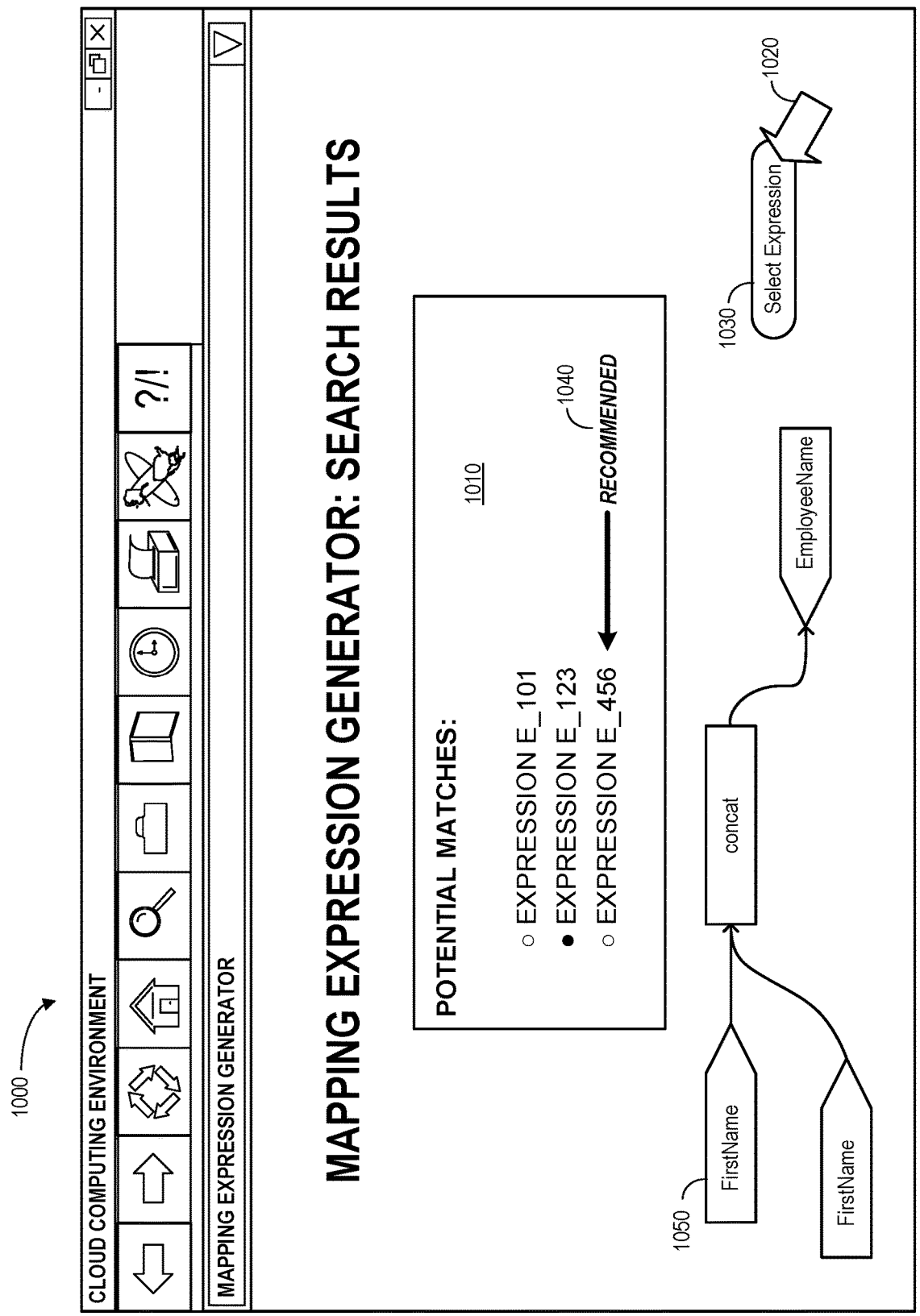
FIG. 10 is a mapping expression search result display according to some embodiments.

FIG. 10 is a mapping expression search result display 1000 according to some embodiments. The display 1000 includes a list of one or more search results 1010 of qualified mapping expressions in accordance with any of the embodiments described herein. Selection of an element on the display 1000 (e.g., via a touchscreen or a computer pointer 1020) may result in display of a popup window containing more detailed information about that element and/or various options (e.g., to add a data element, modify a mapping, etc.). Selection of a "Select Expression" icon 1030 may let an operator or administrator import that expression. When the results 1010 include multiple expressions, some embodiments further include a "recommended" indication 1040 that the system might use to indicate the best performing expression. According to some embodiments, a graphical representation 1050 of expression mapping may also be provided on the display 1000.

Figure 11:
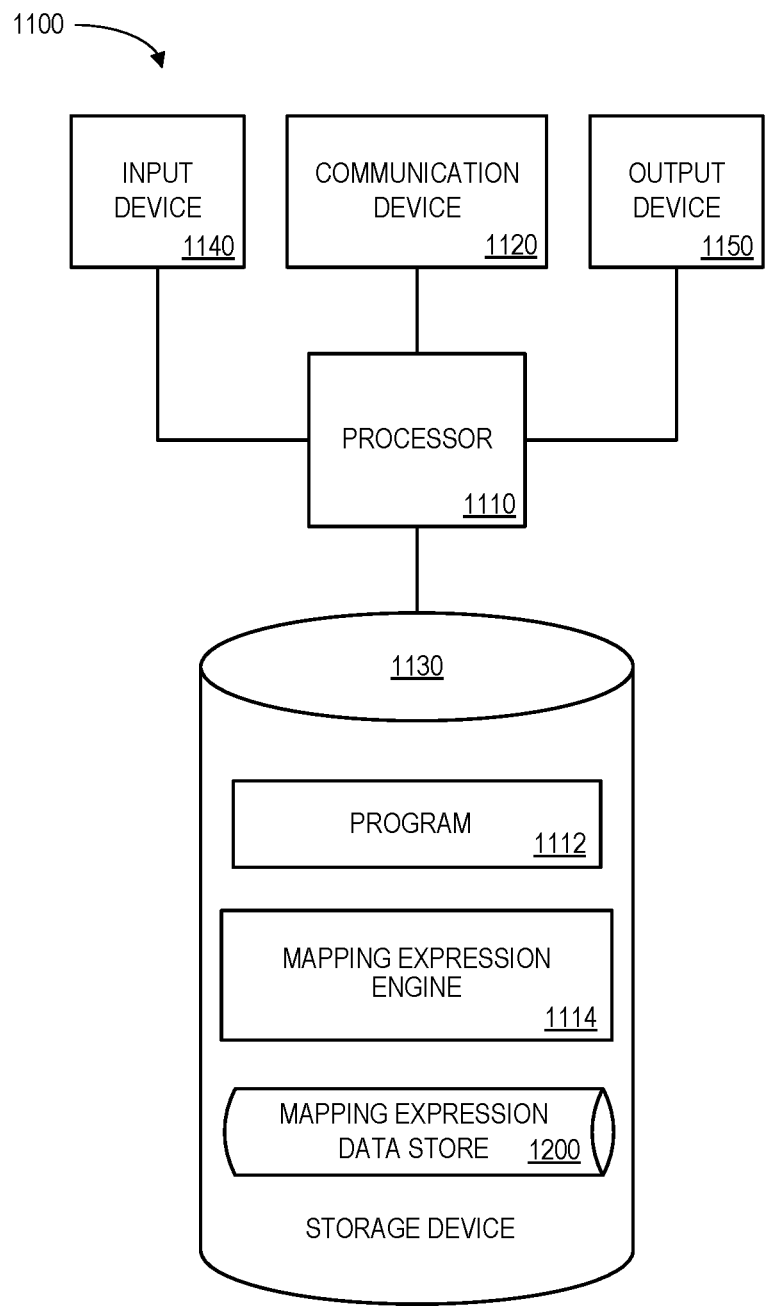
FIG. 11 is an apparatus or platform according to some embodiments.

Note that the embodiments described herein may also be implemented using any number of different hardware configurations. For example, FIG. 11 is a block diagram of an apparatus or platform 1100 that may be, for example, associated with the systems 400, 700, 800 of FIGS. 4, 7, and 8, respectively (and/or any other system described herein). The platform 1100 comprises a processor 1110, such as one or more commercially available Central Processing Units ("CPUs") in the form of one-chip microprocessors, coupled to a communication device 1160 configured to communicate via a communication network (not shown in FIG. 11). The communication device 1160 may be used to communicate, for example, with one or more remote user platforms, administrator platforms, etc. The platform 1100 further includes an input device 1140 (e.g., a computer mouse and/or keyboard to input cloud integration platform information) and/an output device 1150 (e.g., a computer monitor to render a display, transmit recommendations, and/or create reports about users, customers, mapping expressions, etc.). According to some embodiments, a mobile device, monitoring physical system, and/or PC may be used to exchange information with the platform 1100.

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or a mapping expression engine 1114 for controlling the processor 1110. The processor 1110 performs instructions of the programs 1112, 1114, and thereby operates in accordance with any of the embodiments described herein. For example, the processor 1110 may receive, from a user of a first customer tenant, a mapping expression search request that includes at least one requested source mapping element and at least one requested target mapping element. The processor 1110 may then search a mapping expression data store 1200 based on the at least one requested source mapping element and at the least one requested target mapping element and output a result of the search to the user. The result of the search may include, for example, at least one mapping expression created by a customer tenant other than the first customer tenant.

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the platform 1100 from another device; or (ii) a software application or module within the platform 1100 from another software application, module, or any other source.

In some embodiments (such as the one shown in FIG. 11), the storage device 1130 further stores the mapping expression data store 1200. An example of a database that may be used in connection with the platform 1100 will now be described in detail with respect to FIG. 12. Note that the database described herein is only one example, and additional and/or different information may be stored therein. Moreover, various databases might be split or combined in accordance with any of the embodiments described herein.

Figure 12:
FIG. 12 is portion of a mapping expression data store in accordance with some embodiments.

Referring to FIG. 12, a table is shown that represents the mapping expression data store 1200 that may be stored at the platform 1100 according to some embodiments. The table may include, for example, entries associated with previously defined message mapping expressions associated with a cloud computing environment. The table may also define fields 1202, 1204, 1206, 1208, 1210 for each of the entries. The fields 1202, 1204, 1206, 1208, 1210 may, according to some embodiments, specify: a user identifier 1202 and customer, source elements 1204, target elements 1206, a sample file 1208, and mapping expressions 1210. The mapping expression data store 1200 may be created and updated, for example, when new users or customers are added to a system, new expression searches are performed, etc.

The user identifier 1202 and customer might be a unique alphanumeric label that is associated with a user who is searching for a previously defined message mapping expression (e.g., defined by other customers). The source elements 1204 and target elements 1206 may be entered by the user and provide information that can be used to search through previously indexed mapping expressions. The sample file 1208 may provide test inputs and outputs that can be used to evaluate potential matches. The mapping expressions 1210 may represent successful matches that have been found by the system and are therefore available to the user.

Thus, embodiments may facilitate creation of mapping expressions associated with a cloud computing environment in a secure, automatic, and efficient manner. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of message mapping expressions, any of the embodiments described herein could be applied to other types of applications. Moreover, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:
1. A system associated with a cloud platform computing environment, comprising:
   a mapping expression data store containing mapping expressions previously created by a plurality of cus- tomer tenants of the cloud platform, each mapping expression including at least one source mapping element and at least one target mapping element and at least one function that transforms the at least one source mapping element into the at least one target mapping element; and a mapping expression generator and a mapping parser coupled to the mapping expression data store, including:
- a computer processor, and
- computer memory, coupled to the computer processor, storing instructions that, when executed by the computer processor cause the processor to:
  - (i) receive, at the mapping parser, from individual customer tenant systems, a set of mapping expressions previously created by the plurality of customer tenants and previously stored on individual customer tenant systems;
  - (ii) determine a source field and a target field for each mapping expression in the set of received mapping expressions;
  - (iii) index the determined source field and the determined target field in the mapping expression data store, wherein the indexed source field and the indexed target field are stored in the mapping expression data store as part of the contained mapping expressions;
  - (iv) receive, from a user of a first customer tenant, a mapping expression search request, via selection at a user interface, to search for previously created mapping expressions, the mapping expression search request including at least one requested source field as a source mapping element and at least one requested target field as a target mapping element,
  - (v) validate the request includes selection of the at least one requested source field and the at least one requested target field,
  - (vi) responsive to the validation, identify, in the mapping expression data store, at least one mapping expression including both the at least one requested source mapping element and the at least one requested target mapping element, and
  - (vii) output a result of the identification to the user, the result of the identification including at least one previously created mapping expression created by a customer tenant other than the first customer tenant, the output result including the source field selected at the user interface, the target field selected at the user interface, and the at least one function that transforms the source field into the target field as the previously created mapping expression.

2. The system of claim 1, wherein the source mapping elements comprise source extensible markup language elements and the target mapping elements comprise target extensible markup language elements.

3. The system of claim 1, wherein the mapping expression generator further receives, from the user, a sample file including sample source mapping elements and sample target mapping elements and the sample file is different from the source mapping element and target mapping element received in the mapping expressions search request.

4. The system of claim 3, wherein the mapping expression generator tests the result of the search using the sample file before outputting the result of the search to the user.

5. The system of claim 4, wherein the result of the search includes multiple potential mapping expressions.

6. The system of claim 5, wherein at least some of the multiple potential mapping expressions are removed from the result of the search based on tests using the sample file.

7. The system of claim 5, wherein at least some of the multiple potential mapping expressions are removed from the result of the search based on a performance parameter.

8. The system of claim 7, wherein the performance parameter includes at least one of: (i) speed, (ii) resources, (iii) memory, (iv) disk space, and (v) processing power.

9. The system of claim 1, wherein the mapping expression generator includes an indexing platform and a back-end server.

10. The system of claim 1, further comprising process steps to: render the result as a graphical representation of the result on the user interface, the result including multiple previously created potential mapping expressions and a recommended indication for a best performing mapping expressions of the multiple previously created potential mapping expressions.

11. A computer-implemented method associated with a cloud platform computing environment, comprising:
- providing a mapping expression data store containing previously created mapping expressions, each previously created mapping expression including at least one source field, at least one target field and at least one function that transforms the source field into the target field;
- receiving from individual customer tenant systems, a set of mapping expressions previously created by a plurality of customer tenants and previously stored on the individual customer tenant systems;
- determining a source field and a target field for each mapping expression in the set of received mapping expressions;
- indexing the determined source field and the determined target field in the mapping expression data store, wherein the indexed source field and the indexed target field are stored in a mapping expression data store as part of contained mapping expressions;
- receiving, from a user of a first customer tenant, a mapping expression search request, via selection at a user interface, to search for previously created mapping expressions, the mapping expression search request including at least one requested source field as a source mapping element and at least one requested target field as a target mapping element;
- validating the request includes selection of the at least one requested source field and the at least one requested target field;
- responsive to the validation, identifying, in the mapping expression data store, at least one mapping expression including both the at least one requested source mapping element and at the least one requested target mapping element; and
- outputting a result of the identification to the user, the result of the identification including at least one previously created mapping expression created by a customer tenant other than the first customer tenant, the output result including the at least one source field selected at the user interface, the at least one target field selected at the user interface, and the at least one function that transforms the source field into the target field as the previously created mapping expression.

12. The method of claim 11, wherein the source mapping elements comprise source extensible markup language elements and the target mapping elements comprise target extensible markup language elements.

13. The method of claim 11, further receiving, from the user, a sample file including sample source mapping elements and sample target mapping elements.

14. The method of claim 13, wherein a mapping expression generator tests the result of the search using the sample file before outputting the result of the search to the user.

15. The method of claim 14, wherein the result of the search includes multiple potential mapping expressions.

16. The method of claim 15, wherein at least some of the multiple potential mapping expressions are removed from the result of the search based on tests using the sample file.

17. A non-transitory, computer readable medium having executable instructions stored therein that, when executed by a computer processor cause the processor to perform a method associated with a cloud platform computing environment, the method comprising:
provided a mapping expression data store containing previously created mapping expressions, each previously created mapping expression including at least one source field, at least one target field and at least one function that transforms the source field into the target field;
receiving, from individual customer tenant systems, a set of mapping expressions previously created by a plurality of customer tenants and previously stored on individual customer tenant systems;
determining a source field and a target field for each mapping expression in the set of received mapping expressions;
indexing the determined source field and the determined target field in the mapping expression data store, wherein the indexed source field and the indexed target field are stored in the mapping expression data store as part of the contained mapping expressions;
receiving, from a user of a first customer tenant, a mapping expression search request, via selection at a user interface, to search for previously created mapping expressions, the mapping expression search request including at least one requested source field as a source mapping element and at least one requested target field as a target mapping element;
validating the request includes selection of the at least one requested source field and the at least on requested target field;
responsive to the validation, identifying in the mapping expression data store, at least one mapping expression including both the at least one requested source mapping element and at the least one requested target mapping element; and
outputting a result of the identification to the user, the result of the identification including at least one previously created mapping expression created by a customer tenant other than the first customer tenant, the output result including the at least one source field selected at the user interface, the at least one target field selected at the user interface, and the at least one function that transforms the source field into the target field as the previously created mapping expression.

18. The medium of claim 17, wherein the method further comprises:
receiving, from the user, a sample file including sample source mapping elements and sample target mapping elements and
testing the result of the search using the sample file before outputting the result of the search to the user.

19. The medium of claim 17, wherein at least some multiple potential mapping expressions are removed from the result of the search based on a performance parameter.

20. The medium of claim 19, wherein the performance parameter includes at least one of: (i) speed, (ii) resources, (iii) memory, (iv) disk space, and (v) processing power.

* * * * *